United States Patent
Tojo

(10) Patent No.: US 7,080,819 B2
(45) Date of Patent: Jul. 25, 2006

(54) FUEL INJECTION VALVE HAVING INTERNAL OIL GROOVE

(75) Inventor: Senta Tojo, Nagoya (JP)

(73) Assignee: Denson Corporation, Kariya (JP)

(*) Notice: Subject to any disclaimer, the term of this patent is extended or adjusted under 35 U.S.C. 154(b) by 48 days.

(21) Appl. No.: 11/011,371

(22) Filed: Dec. 15, 2004

(65) Prior Publication Data

US 2005/0139798 A1    Jun. 30, 2005

(30) Foreign Application Priority Data

Dec. 24, 2003  (JP)  .............................. 2003-426271

(51) Int. Cl.
*F16K 31/02*   (2006.01)
*F02M 51/00*   (2006.01)

(52) U.S. Cl. .............................. 251/129.16; 239/585.1; 239/585.3

(58) Field of Classification Search ........... 251/129.16; 239/585.1, 585.2, 585.3, 585.4, 585.5
See application file for complete search history.

(56) References Cited

U.S. PATENT DOCUMENTS

| 4,830,286 | A | * | 5/1989 | Asslaender et al. | ...... 239/585.3 |
| 5,636,615 | A | * | 6/1997 | Shorey et al. | .............. 123/506 |
| 5,820,101 | A | * | 10/1998 | Ricco | .................... 251/129.16 |
| 6,126,094 | A | | 10/2000 | Ricco | |

* cited by examiner

*Primary Examiner*—Edward K. Look
*Assistant Examiner*—John K. Fristoe, Jr.
(74) *Attorney, Agent, or Firm*—Nixon & Vanderhye P.C.

(57) ABSTRACT

A fuel injection valve includes a solenoid, which is filled with low-pressure oil. The solenoid receives a biasing means and a movable member. The movable member is actuated by the biasing means and magnetic force generated by the solenoid. The movable member includes a flat-plate portion that contacts with the solenoid and departs from the solenoid. The outer circumferential periphery of the flat-plate portion has multiple notches, through which low-pressure fuel flows into to the upper side of the flat-plate portion that has an oil passage groove, through which a center portion of flat-plate portion communicates with the outer circumferential portion of flat-plate portion. Each notch has a deepest portion that is radially most recessed from the outer circumferential periphery of the flat-plate portion. The oil passage groove is apart from a deepest portion of the notches.

18 Claims, 6 Drawing Sheets

FUEL INJECTION VALVE HAVING INTERNAL OIL GROOVE

CROSS REFERENCE TO RELATED APPLICATIONS

This application is based on and incorporates herein by reference Japanese Patent Application No. 2003-426271 filed on Dec. 24, 2003.

FIELD OF THE INVENTION

The present invention relates to an electromagnetically controlled fuel injection valve that injects high-pressure fuel, which is pressurized by a feed pump and accumulated in a common rail, into a combustion chamber of an internal combustion engine.

BACKGROUND OF THE INVENTION

An electromagnetically controlled fuel injection valve is used for a pressure-accumulating type fuel injection apparatus such as a common rail. The fuel injection valve injects high-pressure fuel, which is fed from the common rail, into a combustion chamber of an engine. The fuel injection valve includes an injection valve body having an injection nozzle and a solenoid valve. The solenoid valve includes a solenoid and a valve device. The solenoid receives a control signal from an engine control unit (ECU), so that the solenoid opens and closes the valve device. The valve device controls pressure of fuel received in a pressure control chamber that actuates the injection valve body.

The solenoid has a movable member that is axially displaced when the solenoid is turned ON (energized) and the solenoid is turned OFF (de-energized). The movable member is used as a valve body of the valve device. The movable member is displaced, so that a valve port, which is an outlet port such as an orifice provided to the pressure control chamber, is opened. The outlet port is opened, so that hydraulic pressure of high-pressure fuel received in the pressure control chamber is controlled. Pressure is applied to a needle valve of the injection nozzle via a control piston of the valve body of the fuel injection valve, so that the control piston and the needle valve are displaced, and an injection nozzle port is opened and closed.

As shown in FIG. 2, a fuel injection valve 1 has a solenoid valve 3 that includes a solenoid 30 having an inner cylinder 32. The inner cylinder 32 radially internally receives a magnet core 33 that receives a magnet coil 35. The outer circumferential periphery of the magnet core 33 is surrounded by an outer cylinder 34. A movable member 5, which includes a flat-plate portion 51 and a shaft portion 52, are received in a lower portion of the magnet core 33. The flat-plate portion 51 has an attracted face on its upper side. The shaft portion 52 downwardly extends from the center of the flat-plate portion 51. The movable member 5 is supported by a cylindrical movable member holder 6 such that the shaft portion 52 is capable of vertically sliding in the movable member holder 6.

An orifice plate 7, which has an outlet orifice 73, is provided to the lower side of the movable member holder 6. A ball valve 78 is provided to the lower end of the shaft portion 52 to plug and unplug the outlet orifice 73. The movable member 5 is urged by a spring (biasing means) 36 to the lower side in the direction, in which the ball valve 78 plugs the outlet orifice 73. The movable member 5 is upwardly attracted in the direction, in which the ball valve 78 unplugs the outlet orifice 73, by magnetic force generated by the solenoid 30, so that the movable member 5 vertically displaces within a movable stroke that is about 0.05 mm. Response of displacement of the movable member corresponds to response of injection control of the fuel injection valve 1.

As the movable member 5 vertically displaces, the movable member 5 upwardly collides against a stopper face (lower end face) of the inner cylinder 32 and downwardly collides against the orifice plate 7 via the ball valve 78. Accordingly, the movable member 5 is repeatedly impacted.

Low-pressure fuel is filled in the solenoid. Therefore, when the movable member 5 vertically displaces, fluid resistance is generated due to viscosity of the low-pressure fuel. Therefore, fluid resistance of low-pressure fuel needs to be reduced for enhancing response of the movable member 5. Conventionally, multiple notches 53 shown in FIG. 5 are formed in the outer circumferential periphery of the movable member 50, so that fluid resistance of low-pressure fuel applied to the movable member 50 is reduced. Besides, weight of the movable member 5 is reduced by forming the notches 53. Thus, response of displacement of the movable member 50 is enhanced, so that response of injection control of the fuel injection valve 1 is enhanced.

A conventional movable member 5J shown on the left side in FIG. 6 has three notches 53 in the outer circumferential periphery of the flat-plate portion 51. Each notch 53 has a V-shape that circumferentially opens at a substantially 60° angle. Radial distance between a deepest portion 5A, i.e., smallest diameter portion of the flat-plate portion 51 and a contacting portion (contacting face 5D) is 0.9 mm. Oil passage grooves 58 are formed on an attracted face of the flat-plate portion 51 such that the oil passage grooves 58 communicate with the deepest portions 5A of the notches 53. Thus, low-pressure fuel can smoothly flow into the upper side of the flat-plate portion 51. Besides, weight of the movable member 5J can be reduced. However, stress is concentrated to the deepest portions 5A in the conventional movable member 5J due to impact arising in the vertical displacement. Therefore, the conventional structure of the movable member 5J does not have sufficient endurance.

A movable member 5H shown on the middle side in FIG. 6 has three notches 53, which have the same area as that of the conventional movable member 5J. Each notch 53 has a V-shape that circumferentially opens at a substantially 90° angle. Radial distance between a deepest portion 5A of the flat-plate portion 51 and the contacting face is 2.0 mm. In this structure, stress concentrated to the deepest portion 5A can be reduced compared with the structure of the conventional movable member 5J. However, each oil passage groove 58 communicates with the deepest portion 5A, and stress is apt to be concentrated to the deepest portion 5A. Accordingly, structural strength may be decreased, and endurance of the movable member 5H is not sufficiently enhanced.

SUMMARY OF THE INVENTION

In view of the foregoing problems, it is an object of the present invention to produce a durable fuel injection valve that is capable of quickly moving. Specifically, low-pressure fuel can smoothly flow to an upper side of a flat-plate portion of a movable member of the fuel injection valve, and the movable member can be protected from stress concentration arising in a deepest portion of a notch formed in the outer circumferential periphery of the movable member.

According to the present invention, a fuel injection valve includes a valve body and a solenoid valve. The solenoid valve includes a solenoid that is filled with low-pressure oil. The solenoid includes a valve device and a biasing means. The valve device is actuated by the biasing means and magnetic force generated by the solenoid. The valve device includes a movable member that has a flat-plate portion having an attracted face. The attracted face of the flat-plate portion is capable of contacting with the solenoid and departing from the solenoid. The flat-plate portion has an outer circumferential periphery that defines multiple notches, through which low-pressure fuel flows into a space defined between the solenoid and the attracted face. The attracted face of the flat-plate portion defines an oil passage groove, through which a center portion of the attracted face communicates with the outer circumferential portion of the attracted face. Thus, low-pressure fuel is capable of flowing between the center portion of the attracted face and the outer circumferential portion of the attracted face through the oil passage groove. Each notch has a deepest portion that is radially most recessed from the outer circumferential periphery of the flat-plate portion. The oil passage groove is apart from the deepest portion of the notches.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
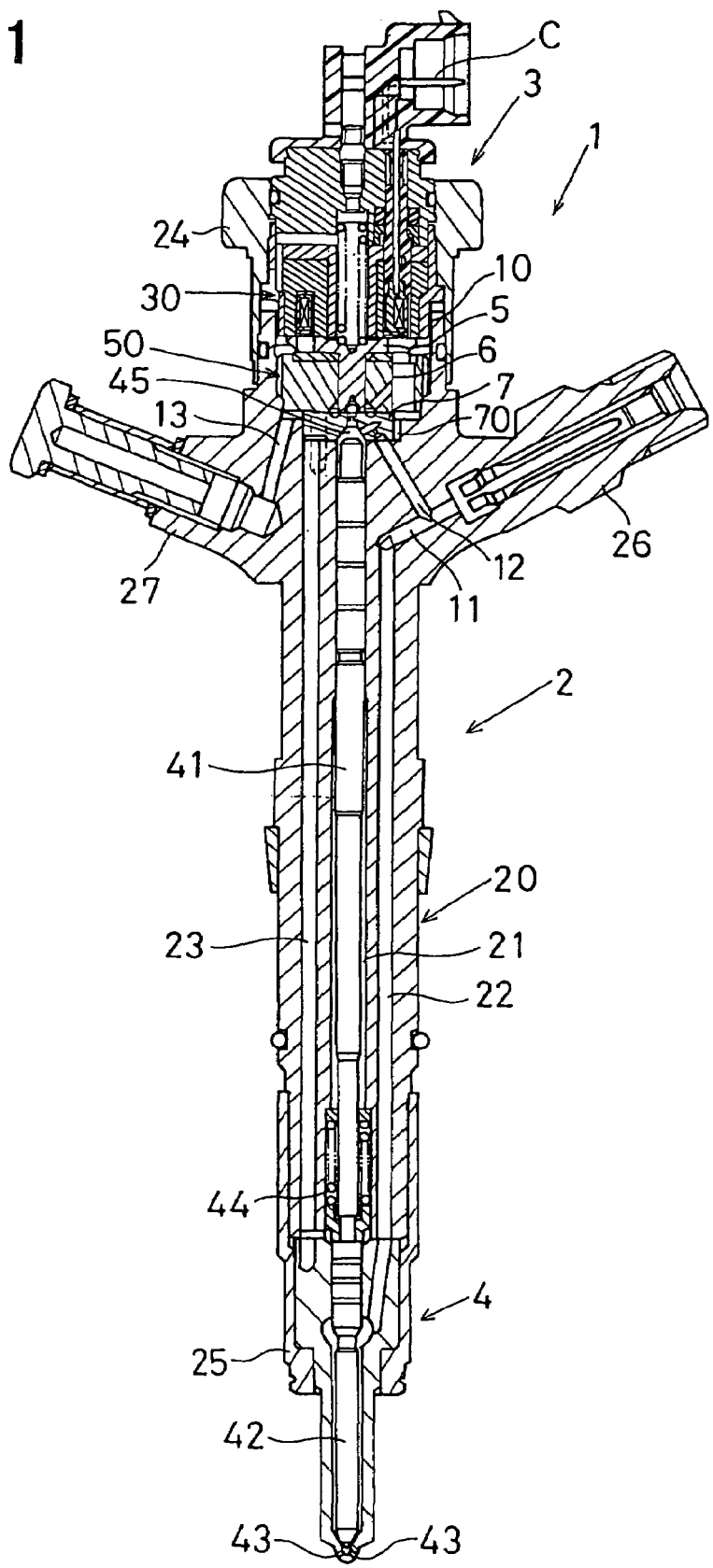
FIG. 1 is a partially cross sectional side view showing a fuel injection valve according to a first embodiment of the present invention.

A fuel injection valve 1 shown in FIG. 1 is used for a pressure-accumulating type (common-rail type) fuel injection apparatus for a diesel engine. High-pressure fuel is fed from a common rail (not shown) into the fuel injection valve 1. The fuel injection valve 1 is electromagnetically controlled such that the fuel injection valve 1 intermittently injects the high-pressure fuel into a combustion chamber of an engine. The fuel injection valve 1 is constructed of an injection valve body 2, a solenoid valve 3, and an injection nozzle 4. The solenoid valve 3 is arranged on the upper end side of the injection valve body 2. The injection nozzle 4 is secured to the lower end portion of the injection valve body 2. The solenoid valve 3 includes a connector C, which is electrically connected with a wire harness connected with an engine control unit (ECU, not shown), so that the solenoid valve 3 is controlled by a control signal transmitted from the ECU.

The injection valve body 2 has a bar shape, and includes a cylinder 21 that penetrates the axial center of the injection valve body 2. The injection valve body 2 internally forms a high-pressure fuel passage 22 to be in parallel with the cylinder 21. The injection valve body 2 includes a valve body 20, in which a low-pressure fuel passage 23 is formed. The upper end portion of the valve body 20 has a cylindrical solenoid valve chamber 10, to which the solenoid valve 3 is secured. An injection nozzle 4 is coaxially secured to the lower end portion of the valve body 20 using a retaining nut 25. A cylindrical inlet portion 26 and a cylindrical outlet portion 27 are provided to the upper end portion of the valve body 20 such that the inlet portion 26 and the outlet portion 27 are inclined to the upper side in FIG. 1.

The solenoid valve 3 is constructed of a solenoid 30 and a valve device 50. The solenoid 30 is arranged on the upper side of the solenoid valve chamber 10. The valve device 50 is arranged on the lower side of the solenoid valve chamber 10. The valve device 50 has a movable member 5 received in a movable member holder 6. The lower face of the solenoid 30 and the movable member holder 6 forms a movable member chamber 60 (FIG. 2) therebetween. The movable member 5 vertically moves in the movable member chamber 60. The movable member holder 6, i.e., the solenoid valve chamber 10 receives a plate chamber 70 on the lower side in FIG. 1. The plate chamber 70 is radially smaller than the movable member chamber 60, and receives a circular orifice plate 7.

The cylinder 21 receives a control piston 41. The injection nozzle 4 receives a needle valve 42 that contacts with the control piston 41. The lower end portion of the injection nozzle 4 in FIG. 1 has an injection port 43. The needle valve 42 is urged by a spring 44, which is received in the lower portion of the cylinder 21, to the lower side in FIG. 1 in the direction, in which the needle valve 42 closes the injection port 43. The upper end portion of the control piston 41 and the orifice plate 7 form a pressure control chamber 45 therebetween.

Hydraulic pressure in the pressure control chamber 45 and resilient force of the spring 44 is applied to the needle valve 42 to the lower side in FIG. 1. Hydraulic pressure in the injection nozzle 4 is applied to the needle valve 42 to the upper side. The needle valve 42 vertically reciprocates in accordance with balance of the spring load and the hydraulic pressure applied to the needle valve 42 in the vertical direction, so that the needle valve 42 opens and closes the injection port 43. Specifically, when pressure in the pressure control chamber 45 becomes low, the control piston 41 and the needle valve 42 upwardly move, so that the injection port 43 is opened and high-pressure fuel, which is fed into the injection nozzle 4 through the high-pressure fuel passage 22, is injected into the combustion chamber of the engine.

The inlet portion 26 internally forms a high-pressure fuel passage 11 and an inlet passage 12. The high-pressure fuel passage 11 communicates with the high-pressure fuel passage 22. The high-pressure fuel passage 11 and the plate chamber 70 communicate with each other through the inlet passage 12. The outlet portion 27 internally forms an outlet passage 13 that communicates with the low-pressure fuel passage 23 through the plate chamber 70 to construct an exhaust passage, through which surplus fuel is exhausted from the fuel injection valve 1 to the outside.

Figure 2:
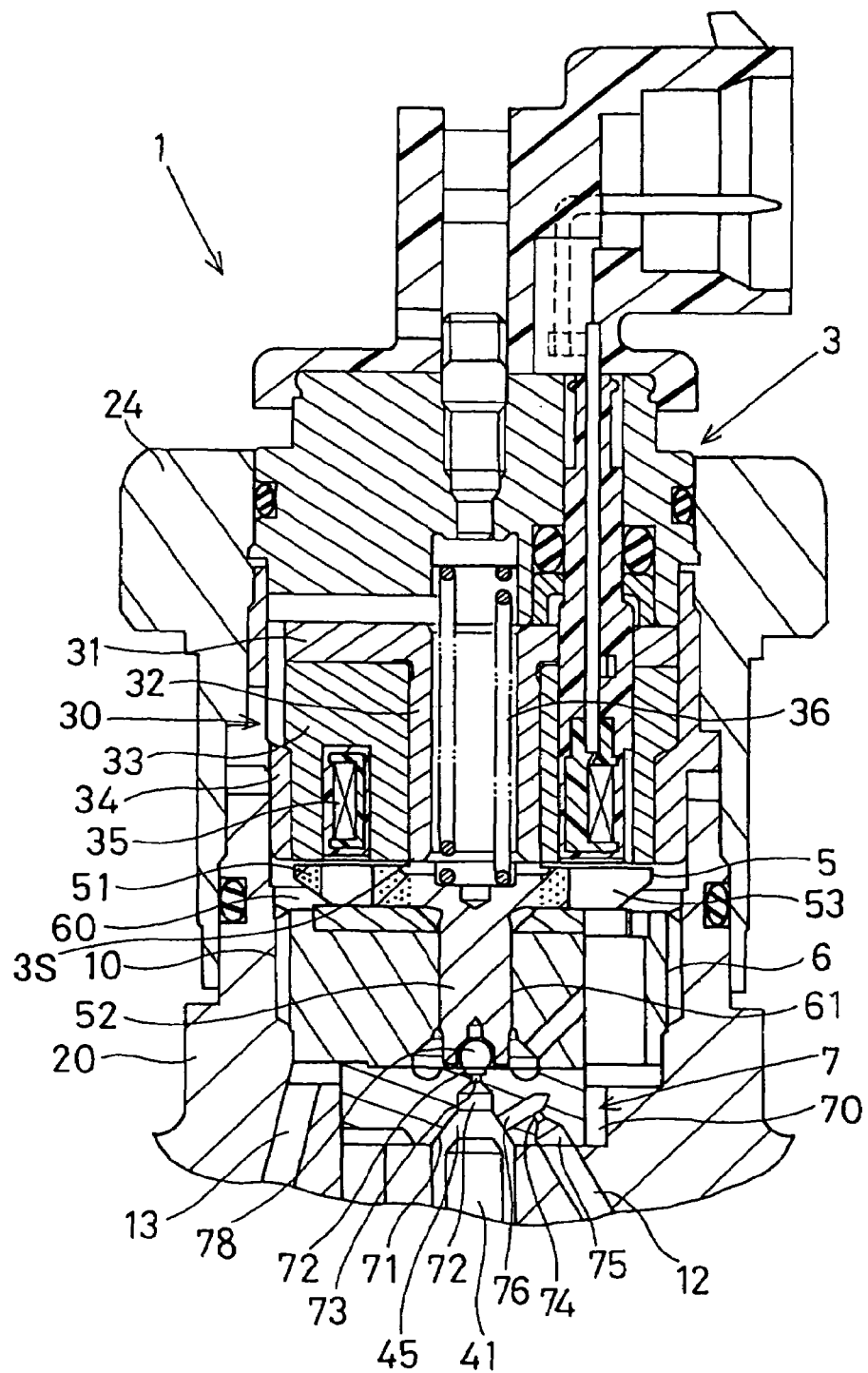
FIG. 2 is a cross-sectional side view showing a solenoid valve of the fuel injection valve according to the first embodiment.

As shown in FIG. 2, the orifice plate 7 has a conically recessed portion 71 in the center of the lower face to form the pressure control chamber 45. The conically recessed portion 71 has an outlet orifice 73 on the upper side. The outlet orifice 73 is vertically inserted between large diameter portions 72 that are arranged on both the upper side and the lower side with respect to the outlet orifice 73. The orifice plate 7 has an inclined hole 75 that is opened from the lower face of the orifice plate 7. An inlet orifice 74 is formed in the orifice plate 7. An inlet hole 76 is opened in the orifice plate 7 from the conically recessed portion 71 such that the inlet hole 76 communicates with the inclined hole 75 through the inlet orifice 74. As shown in FIGS. 1, 2, high-pressure fuel, which is fed from the common rail, is introduced into the pressure control chamber 45 through the high-pressure fuel passage 11, the inlet passage 12, the inclined hole 75, the inlet orifice 74, and the inlet hole 76. Thus, pressure of high-pressure fuel is transferred from the high-pressure fuel passage 11 to the pressure control chamber 45.

The solenoid 30 has an inner cylinder 32, a magnet core 33, an outer cylinder 34, and a magnet coil 35. The inner cylinder 32 is made of a ferromagnetic material. A collar potion 31 is provided to the upper side of the inner cylinder 32. The magnet core 33, which is made of a compound magnetic material (SMC), is provided to the outer circumferential periphery of the inner cylinder 32. The magnet coil 35 is received in the magnet core 33. The lower face of the solenoid 30 attracts the movable member 5. The lower end face of the inner cylinder 32 serves as a stopper such that the movable member 5 collides against the lower end face of the inner cylinder 32, so that the movable member 5 contacts with the inner cylinder 32, and the movable member 5 is stopped.

Figure 4:
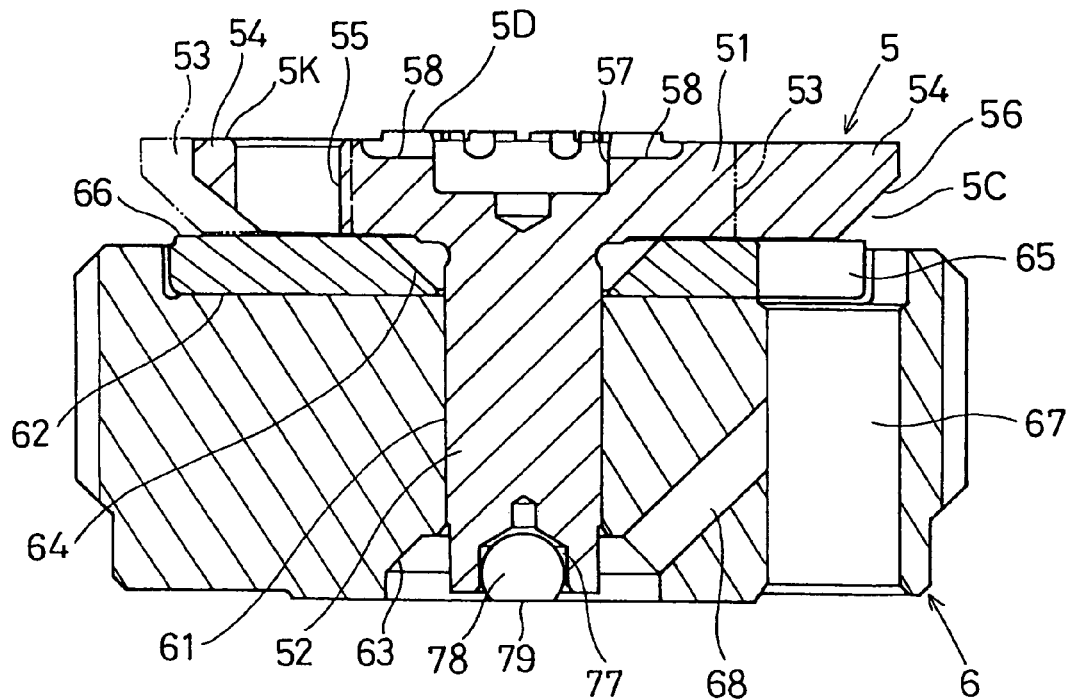
FIG. 4 is a cross-sectional side view taken along the line IV—IV in FIG. 3 according to the first embodiment.

The movable member 5 has a flat-plate portion 51 and a shaft portion 52. The shaft portion 52 has a substantially round bar shape. The shaft portion 52 is received in the movable member chamber 60. The movable member holder 6 is formed in a cylindrical shape having a center hole 61, into which the shaft portion 52 of the movable member 5 is slidably inserted. As shown in FIG. 4, the upper face of the flat-plate portion 51 is formed to be a flat face (attracted face 5K), which is attracted to the lower face of the solenoid 30. The movable member holder 6 has a thread on the outer circumferential periphery, and the movable member holder 6 is screwed into an inner screw formed in an inner circumferential periphery of the solenoid valve chamber 10 (FIG. 2).

As shown in FIGS. 2, 4, the shaft portion 52 is formed in a substantially column-shape. The center of the lower end face of the shaft portion 52 has a vale body chamber 77 that is formed of a cylindrical portion and a conical portion. A ball valve 78 has a sealing flat face 79 on the lower side to plug the outlet orifice 73. The movable member 5 is urged by a spring (biasing means) 36, which is arranged in the inner cylinder 32, to the lower side. That is, the spring 36 urges the movable member 5 in the direction, in which the ball valve 78 plugs the outlet orifice 73. The movable member 5 is attracted to the upper side by magnetic force generated by the solenoid 30, so that the movable member 5 vertically displaces. Specifically, the solenoid 30 attracts the movable member 5 in the direction, in which the ball valve 78 is removed from the outlet orifice 73.

The inside of the solenoid 30 and the inside of the solenoid valve chamber 10 communicate with the low-pressure fuel passage 23 (FIG. 1) through the outlet passage 13, so that the inside of the solenoid 30 and the inside of the solenoid valve chamber 10 are filled with low-pressure fuel.

The solenoid valve chamber 10 receives the valve device 50. The inside of the solenoid 30 has the movable member chamber 60 and receives the inner cylinder 32. When the movable member 5 vertically displaces, fluid resistance is applied mainly to the flat-plate portion 51. Flow resistance of the low-pressure fuel, which is applied to the flat-plate portion 51, needs to be reduced, and weight of the movable member 5 needs to be reduced to enhance response of the solenoid valve 3 by quickly moving of the movable member 5. The movable member 5 is strongly impacted when the movable member 5 vertically displaces. Therefore, the movable member 5 needs sufficient structural strength for maintaining high endurance.

Figure 3:
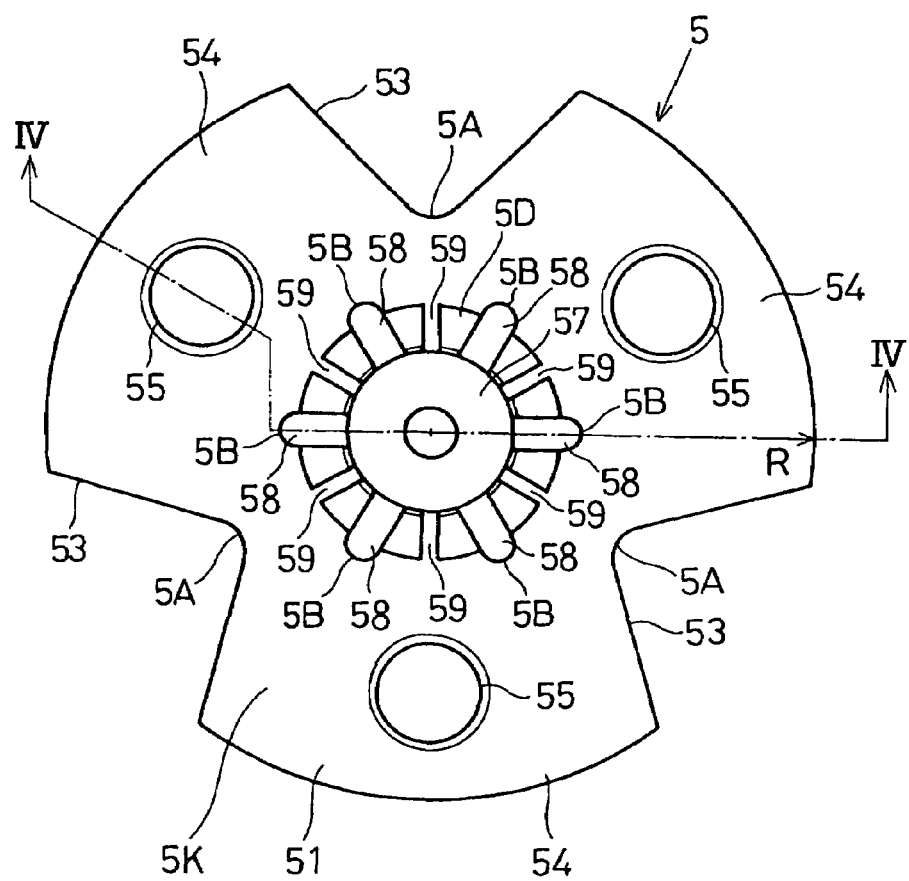
FIG. 3 is a top view showing a movable member according to the first embodiment.
Figure 5:
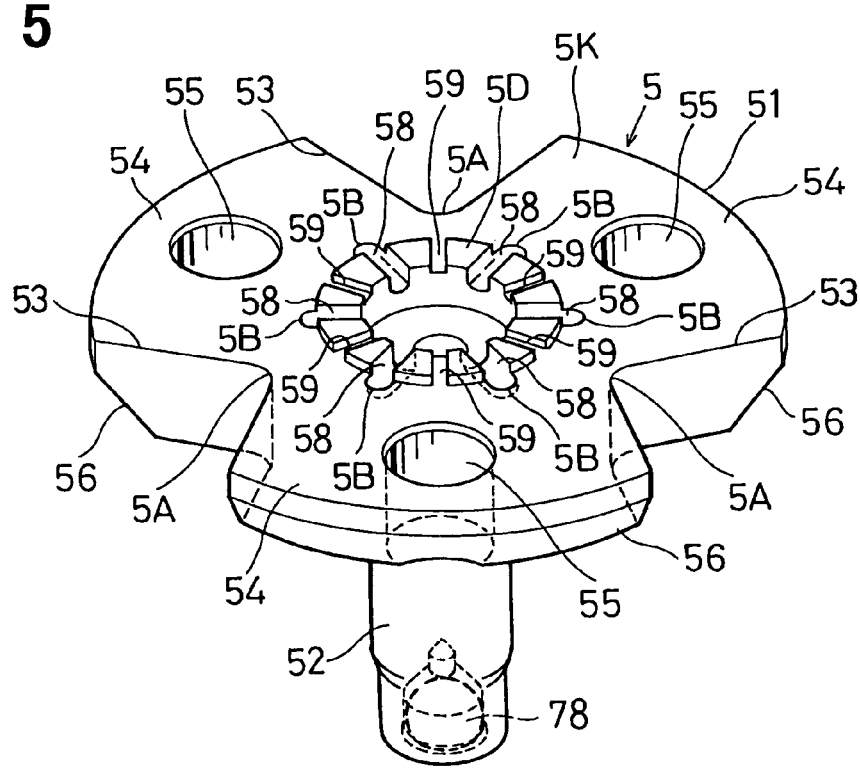
FIG. 5 is a perspective view showing the movable member according to the first embodiment.

As shown in FIGS. 3 to 5, substantially V-shaped, i.e., sector-shaped notches 53 are formed in three places of the outer circumferential periphery of the flat-plate portion 51 of the movable member 5 at regular intervals, i.e., 120°. The notches 53 are formed to reduce fluid resistance of low-pressure fluid and to reduce weight of the movable member 5. The shape of the notches 53 and the number of the notches 53 are determined as appropriate.

Each notch 53 has a depth of about 0.43R with respect to the radius R of the flat-plate portion 51. Each notch 53 has a substantially V-shape that circumferentially opens at a substantially 90° angle. Radial distance between a deepest portion 5A and a contacting flat face 5D is set to be 2.0 mm as shown in the right side in FIG. 6. Intermediate portions 54 are formed respectively between the notches 53 of the flat-plate portion 51 that are circumferentially adjacent to each other. The shape of each notch 53 may be other than the substantially V-shape, i.e., sector shape, as long as the notch 53 has an outer circumferential peripheral length that is greater than an inner circumferential peripheral length of the notch 53.

Circular holes 55 are formed respectively in the circumferentially center portions of the three of the intermediate portions 54. Each circular hole 55 is arranged on a circumferential periphery that is located at a distance of 0.7 R with respect to the radius R of the flat-plate portion 51 from the center of the flat-plate portion 51. The circular hole 55 axially penetrates the flat-plate portion 51.

The outer circumferential periphery of the intermediate portions 54 has an outer circumferential inclined periphery 56 (FIG. 4) on the lower side. The outer circumferential inclined periphery 56 has a height that is substantially ⅔ of the thickness of the flat-plate portion 51 in the axial direction of the flat-plate portion 51. The outer circumferential inclined periphery 56 is inclined substantially 45° toward the axial direction. The circular hole 55 communicates with an annular space 5C, which is located on the lower side of the outer circumferential inclined periphery 56. Thus, fluid resistance of low-pressure fuel, which is applied to the movable member 5, is decreased, and the movable member 5 is reduced in weight, so that response of the movable member 5 is enhanced.

The center of the attracted face (upper face) 5K of the flat-plate portion 51 has a circular recession 57, in which the lower end portion of the spring 36 is partially received. An annular contacting face 5D is formed around the outer circumferential periphery of the circular recession 57 such that annular contacting face 5D has a vertical protrusion that upwardly protrudes from the upper face 5K for substantially 50 micron. The annular contacting face 5D has the area that corresponds to the lower end face (stopper face) of the inner cylinder 32. Six oil passage grooves 58 are formed on the upper side of the flat-plate portion 51 such that the oil passage grooves 58 are circumferentially arranged at predetermined circumferential intervals such as 60°. Each oil passage groove 58 extends from the circular recession 57 in the radial direction. Therefore, the annular contacting face 5D has a substantially intermittent annular shape. The six of the oil passage grooves 58 respectively have outer end portions 5B that are arranged to be circumferentially staggered with respect to the three deepest portions 5A of the notches 53. Specifically, each outer end portion 5B of the oil passage groove 58 is located in the substantially circumferentially middle angular position of the deepest portions 5A of the notches 53 that are circumferentially adjacent each other. Auxiliary grooves 59, in which the vertical protrusions of the annular contacting face 5D are recessed, are alternately arranged in the substantially circumferentially middle angular positions of the oil passage grooves 58 that are circumferentially adjacent to each other. Therefore annular contacting face 5D is further circumferentially intermitted. Each auxiliary groove 59 is formed to be smaller than each oil passage groove 58. Low-pressure fuel passing through the auxiliary groove 59 makes up for a shortage of low-pressure fuel passing through the six of the oil passage grooves 58, so that low-pressure oil can quickly flow around the flat-plate portion 51. The width, the depth, the number, and the position of the auxiliary grooves 59 can be designed as appropriate.

As shown in FIG. 4, the movable member holder 6 has an upper recession 62 having a circular shape on the upper side. The center of the movable member holder 6 has a lower recession 63 on the lower side. An annular plate 66, which has a center hole 64 and a notch 65, is attached to the upper recession 62 of the movable member holder 6. The center hole 64 is formed in a tapered shape that is upwardly widened. The notch 65 communicates with the annular space 5C. The movable member holder 6 has a penetrating hole 67 that axially penetrates the movable member holder 6 such that the penetrating hole 67 communicates with the notches 53 and the annular space 5C. The penetrating hole 67 communicates with the lower recession 63 through an inclined hole 68.

When the solenoid 30 is energized, the movable member 5 is attracted to the upper side by electromagnetic force, so that the annular contacting face 5D collides against the lower face, i.e., stopper face of the inner cylinder 32. The ball valve 78 upwardly moves in conjunction with the movable member 5. In this situation, the outlet orifice 73 is unplugged, and the outlet passage 13 communicates with pressure control chamber 45 through the outlet orifice 73, so that pressure of high-pressure fuel received in the pressure control chamber 45 is reduced to substantially half. Therefore, the control piston 41 shown in FIG. 1 upwardly moves, and the needle valve 42 upwardly moves in conjunction with the control piston 41, so that fuel is injected from the injection port 43.

When the solenoid 30 is de-energized, the movable member 5 downwardly moves by resiliency of the spring 36, so that the ball valve 78 downwardly moves with the shaft portion 52 and plugs the outlet orifice 73. High-pressure fuel is fed from the common rail into the pressure control chamber 45, so that fuel received in the pressure control chamber 45 is increased in pressure. In this situation, the control piston 41 downwardly moves, and the needle valve 42 downwardly moves in conjunction with the control piston 41, so that the injection port 43 is plugged by the needle valve 42, and injection of fuel is finished.

The movable member 5 collides against one of the lower face, i.e., stopper face of the inner cylinder 32 and the orifice plate 7 via the ball valve 78 when the movable member 5 is vertically urged and stopped, and strong impact force is applied to the movable member 5. The strong impact force causes internal stress in the flat-plate portion 51, and the internal stress concentrates to the deepest portions 5A of the notches 53 having a small curvature radius. Therefore, stress, which concentrates to the deepest portions 5A of the notches 53, needs to be reduced to enhance endurance of the movable member 5.

Figure 6:
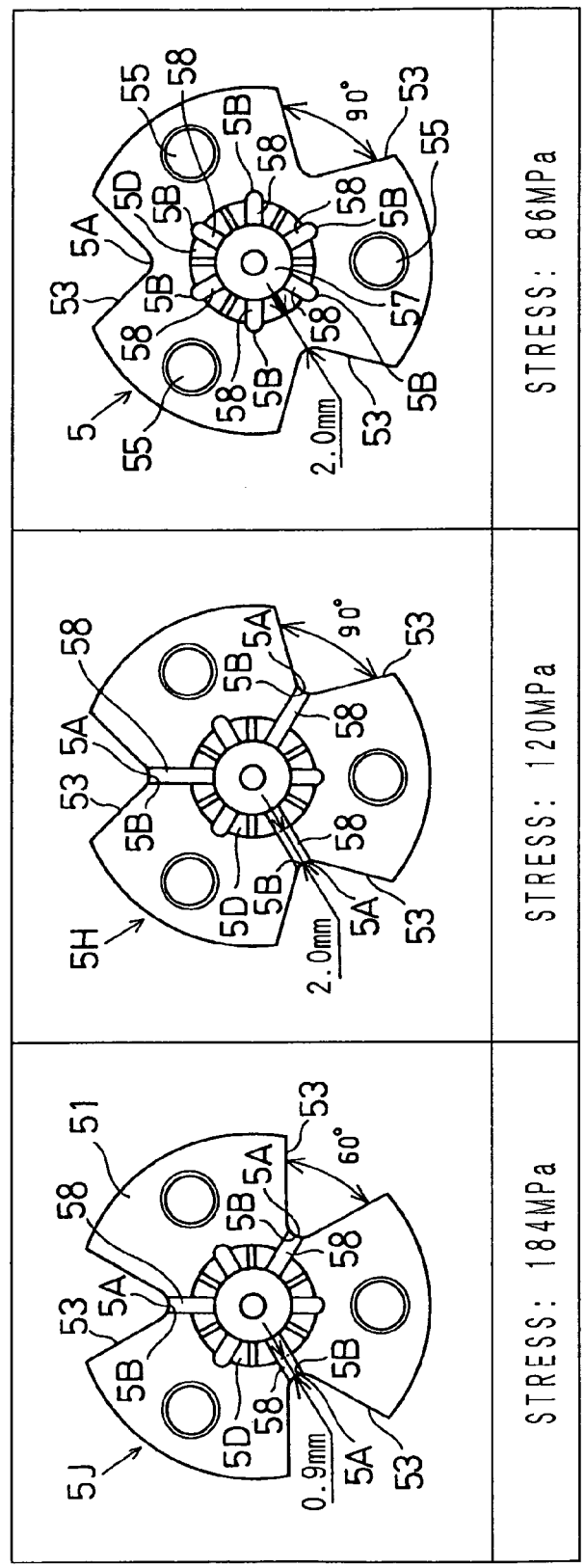
FIG. 6 is a table showing difference of stress concentration arising in the movable member according to the first embodiment.

A conventional movable member 5J is shown on the left side in FIG. 6. A modified movable member 5H on the middle side in FIG. 6 has a structure that is partially modified from the conventional structure of the movable member 5J. The movable member 5 on the right side in FIG. 6 has the structure in the present invention.

The conventional movable member 5J on the left side in FIG. 6 has a notch 53 that is formed in a substantially V-shape, which circumferentially opens at a substantially 60° angle. The radial distance between each deepest portion 5A and the annular contacting face 5D is set to be 0.9 mm, and each outer end portion 5B of the oil passage groove 58 communicates with each deepest portion 5A in the conventional movable member 5J.

The movable member 5H on the middle side in FIG. 6 has a notch 53 that is formed in a substantially V-shape, which circumferentially opens at a substantially 90° angle. The radial distance between each deepest portion 5A and the annular contacting face 5D is set to be 2.0 mm, and each outer end portion 5B of the oil passage groove 58 communicates with each deepest portion 5A in the movable member 5H.

The present movable member 5 on the right side in FIG. 6 has the notch 53 that is formed in a substantially V-shape, which circumferentially opens at a substantially 90° angle. The radial distance between each deepest portion 5A and the annular contacting face 5D is set to be 2.0 mm, and each outer end portion 5B of the oil passage groove 58 does not communicate with each deepest portion 5A in the movable member 5.

The maximum principal stress arising in each deepest portion 5A in the conventional movable member 5J on the left side in FIG. 6 is 184 MPa. The maximum principal stress arising in each deepest portion 5A in the movable member 5H on the middle side in FIG. 6 is 120 MPa. The maximum principal stress arising in each deepest portion 5A in the movable member 5 on the right side in FIG. 6 is 86 MPa in the structure of the present invention. Therefore, stress applied to the deepest portion 5A is significantly reduced in the structure of the movable member 5 in the present invention compared with other structures.

Besides, the outer end portions 5B shown in FIG. 3 of the oil passage grooves 58 are arranged to be circumferentially staggered with respect to the deepest portions 5A of the notches 53 in the movable member 5 in the structure of the present invention. Therefore, each deepest portion 5A is not communicated with each oil passage grooves 58, so that the deepest portion 5A is not hollowed by the oil passage grooves 58. Thus, the deepest portion 5A can be restricted from causing stress concentration, and endurance of the movable member 5 can be significantly enhanced. Low-pressure fuel is capable of flowing to the upper side of the flat-plate portion 51 of the movable member 5 by forming the notches 53, the oil passage grooves 58, and the auxiliary grooves 59, so that the movable member 5 is capable of quickly moving in the vertical direction.

Each notch 53, 81 may be defined in a substantially V-shape that circumferentially opens at an angle that is equal to or greater than 45°.

The deepest portion 5A of the notch 53, 81 may be apart from the annular contacting face 5D for a distance that is equal to or greater than 1.0 mm in the radial direction of the flat-plate portion 15, 82.

The opening angle of each notch 53 is further preferably equal to or greater than 90°, and the radial distance between each deepest portion 5A and the annular contacting face 5D is further preferably equal to or greater than 2.0 mm in view of reduction of stress concentrated to the deepest portion 5A. The angle of the notch 53 and the radial distance between each deepest portion 5A and the annular contacting face 5D are predetermined such that low-pressure fuel can smoothly flow.

The three notches 53 are circumferentially arranged at the regular intervals of 120° in the outer circumferential periphery of the flat-plate portion 51. The six oil passage grooves 58 are circumferentially formed at the regular intervals of 120°. Each deepest portion 5A of the notch 53 is arranged in the substantially circumferentially middle angular position of the circumferentially adjacent outer end portions 5B of the oil passage grooves 58 on the radially outer side. This structure of the movable member 5 is most effective and most practical in view of mechanical strength and manufacturing cost.

The shaft portion 52 of the movable member 5 is molded of a cast material. The flat-plate portion 51 is formed of silicon steel to be in an annular shape. The flat-plate portion 51 is connected with the outer circumferential periphery of the shaft portion 52.

The notches 53 are formed in the flat-plate portion 51, which is made of the silicon steel, and the oil passage grooves 58 are formed in the shaft portion 52, which is made of the cast material. In this structure, the movable member 5, which is ferromagnetic and mechanically strong, can be easily manufactured. Specifically, the flat-plate portion 51 is formed of silicon steel, so that the flat-plate portion 51 can be ferromagnetic. Besides, the shaft portion 52 is molded of a cast material, so that the shaft portion 52 has high strength. The movable member 5 can be restricted from reducing structural strength due to forming the notches 53 and the oil passage grooves 58 in this structure.

The flat-plate portion 51, which is formed of silicon steel, may be sintered onto the outer circumferential periphery of the shaft portion 52, which is molded of cast material in the movable member 5. Specifically, the flat-plate portion 51, which is formed of a sintered material to be in an annular shape, is molded circumferentially around the shaft portion 52 using a die. Alternatively, the flat-plate portion 51, which is molded to be in an annular shape using a die, may be sintered onto the circumferentially around the shaft portion 52. In either case, the annular flat-plate portion 51 may radially shrink in the sintering process, so that the annular flat-plate portion 51 can be steadily secured onto the circumferential periphery of the shaft portion 52. Thus, the flat-plate portion 51 can be easily manufactured, so that the high-rigid movable member 5 can be efficiently produced.

The flat-plate portion 51, which is formed of silicon steel, may be connected with the outer circumferential periphery of the shaft portion 52, which is molded of cast material, using friction pressure welding. In this structure, a high-density cast material can be used for the flat-plate portion 51, so that strength and endurance of the movable member 5 can be enhanced. In this case, the flat-plate portion 51 may be formed in an annular shape, and one axial end of the shaft portion 52 may be inserted into the annular flat-plate portion 51, and connected with the shaft portion 52 using friction pressure welding. In this structure, the axial end of the shaft portion 52 and the inner circumferential periphery of the annular flat-plate portion 51 are preferably formed in a tapered conical shape to be engaged with each other. Alternatively, the flat-plate portion 51 may be formed in a circular shape, and one axial end face of the circular flat-plate portion 51 may be connected with the center of the shaft portion 52 using friction pressure welding.

As shown in FIG. 3, the radial length of each auxiliary groove 59 is less than the radial length of each oil passage groove 58. Therefore, the auxiliary groove 59, in which cross-sectional shape largely changes in the flat-plate portion 51, is radially apart from each deepest portion 5A of each notch 53. Thus, stress, which is concentrated to the deepest portion 5A, can be further reduced.

(Second Embodiment)

Figure 7:
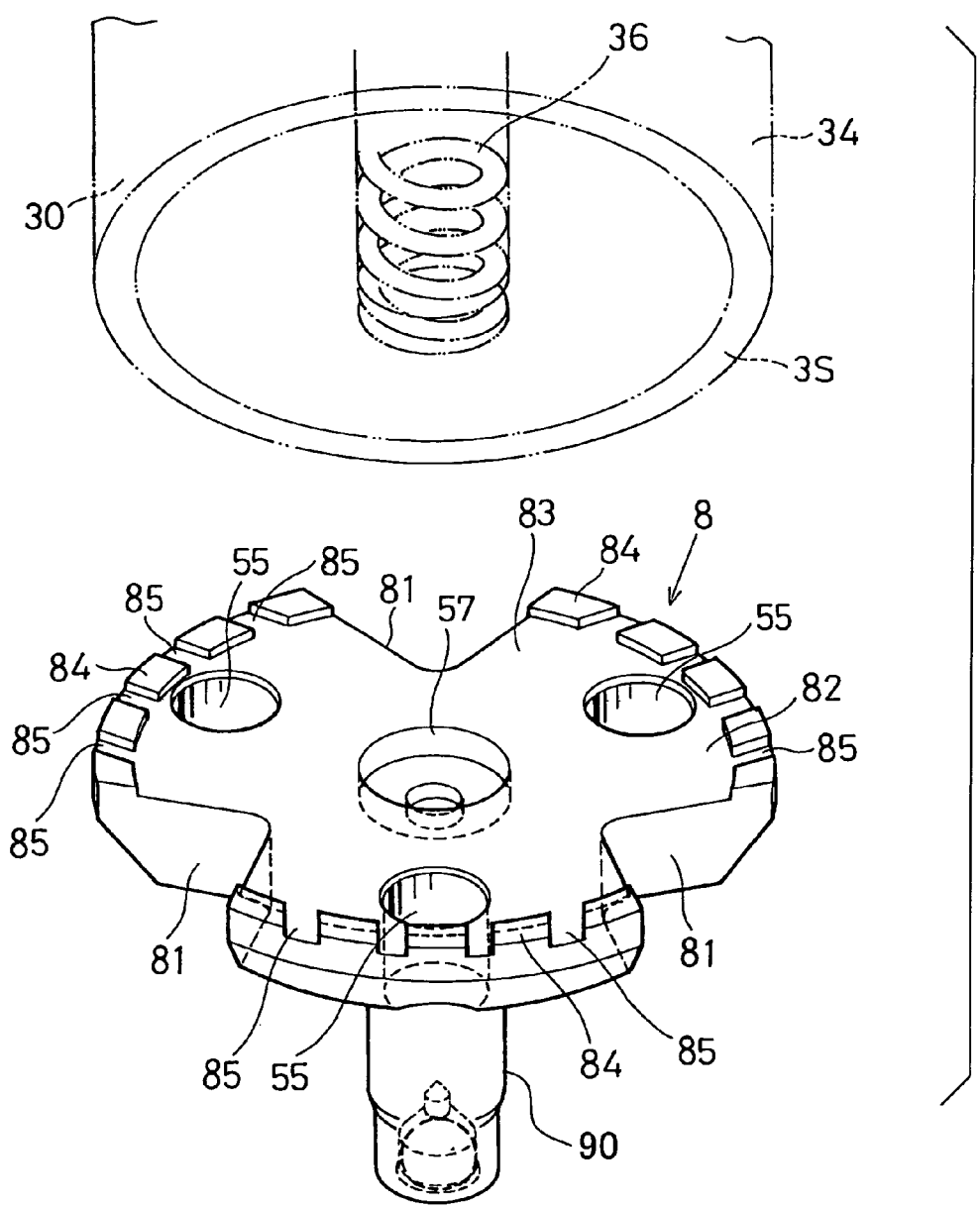
FIG. 7 is a perspective view showing a movable member according to the second embodiment of the present invention.

As shown in FIG. 7, the lower side of the outer cylinder 34 of the solenoid 30 has an annular stopper face 3S in the second embodiment. A movable member 8 has an annular contacting face 84 formed on an outer circumferential periphery of an attracted face (upper face) 83 of a flat-plate portion 82 corresponding to the annular stopper face 3S of the outer cylinder 34. The outer circumferential periphery of the flat-plate portion 82 has the three notches 81. The annular contacting face 84 upwardly protrudes from the upper face 83 of a flat-plate portion 82 for 50 micron. Oil passage grooves 85 are formed radially across the annular contacting face 84.

That is, the oil passage grooves 85 are formed such that the annular contacting face 84 is partially recessed in the axial direction. Therefore, the annular contacting face 84 has a circumferentially intermittent annular shape. Each oil passage groove 85 has a small height in the axial direction and a broad width in the circumferential direction. Low-pressure fuel is capable of smoothly flowing to the upper face of the flat-plate portion 82 through the oil passage grooves 85.

The movable member 8 has a large contacting face with respect to the solenoid 30, so that the movable member 8 can be stably operated. Besides, the width of the oil passage grooves 85 can be enlarged in the circumferential direction, so that low-pressure fuel is capable of sufficiently flowing to the upper face of the flat-plate portion 82 through the oil passage grooves 85.

The annular contacting face 84 is formed on the outer circumferential periphery of the attracted face 83 of the flat-plate portion 82 in the movable member 8. The movable member 8 is preferably integrally molded of a cast material to be one piece in consideration of the structural strength.

In this structure, the movable member 8 contacts with the solenoid 30 in a large area, so that the movable member 8 can be stably operated. Besides, the width of the oil passage grooves 85 can be easily widened, so that low-pressure fuel can quickly flow into the attracted face 83 through the passage grooves 85.

The above structure shown in the first and second embodiments can be combined as appropriate.

Various modifications and alternations may be diversely made to the above embodiments without departing from the spirit of the present invention.

What is claimed is:

1. A fuel injection valve comprising:
   a valve body;
   a solenoid valve that includes a solenoid, which is filled with low-pressure oil,
   wherein the solenoid includes a valve device and a biasing means, the valve device includes a movable member that includes a flat-plate portion having an attracted face, the attracted face of the flat-plate portion contacts with the solenoid when the valve device is actuated by one of magnetic force generated by the solenoid and the biasing means, the attracted face of the flat-plate portion departs from the solenoid when the valve device is actuated by the other one of magnetic force generated by the solenoid and the biasing means, the flat-plate portion has an outer circumferential periphery that defines a plurality of notches through which low-pressure fuel flows into a space defined between the solenoid and the attracted face, the attracted face of the flat-plate portion defines an oil passage groove, through which a center portion of the attracted face communicates with an outer circumferential portion of the attracted face, so that low-pressure fuel is capable of flowing between the center portion of the attracted face and the outer circumferential portion of the attracted face through the oil passage groove, each notch has a deepest portion that is radially most recessed from the outer circumferential periphery of the flat-plate portion, and the oil passage groove is apart from the deepest portion of the notch.

2. The fuel injection valve according to claim 1, wherein the plurality of notches are circumferentially arranged in the outer circumferential periphery of the flat-plate portion at substantially regular intervals, each notch has a shape in which an outer circumferential periphery of the notch has a circumferential length that is greater than a circumferential length of the deepest portion of the notch, the biasing means is a spring that is arranged in the radially center of the solenoid such that the spring contacts with a recession defined in a center portion of the flat-plate portion, the oil passage groove is defined in the flat-plate portion such that the oil passage groove extends from the recession to an outer end portion of the oil passage groove in a substantially radial direction of the flat-plate portion, and the outer end portion is apart from the deepest portion of the notch.

3. The fuel injection valve according to claim 2, wherein the solenoid includes an inner cylinder that receives the spring, the inner cylinder has a stopper face, the recession defined in the attracted face has an outer circumferential periphery that has a substantially intermittently annular-shaped contacting face that is capable of contacting with the stopper face of the inner cylinder, the oil passage groove extends from the recession to the outer end portion of the oil passage groove across the contacting face in the substantially radial direction of the flat-plate portion, and each deepest portion of the notch is arranged in an angular position that is circumferentially between angular positions of the outer end portions of the oil passage groove that are circumferentially adjacent to each other.

4. The fuel injection valve according to claim 3, wherein each deepest portion of the notch is arranged in a circumferentially middle angular position between angular positions of the outer end portions of the oil passage groove that are circumferentially adjacent to each other.

5. The fuel injection valve according to claim 3, wherein the annular contacting face protrudes from the attracted face in the axial direction of the movable member.

6. The fuel injection valve according to claim 3, wherein a plurality of the oil passage grooves extend from the recession respectively to the outer end portions of the oil passage grooves across the contacting face in the substantially radial direction of the flat-plate portion, and the contacting face of the flat-plate portion defines an auxiliary groove that is arranged circumferentially between the plurality of the oil passage grooves that are circumferentially adjacent to each other.

7. The fuel injection valve according to claim 6, wherein the auxiliary groove has a radial length that is less than a radial length of each oil passage groove.

8. The fuel injection valve according to claim 2, wherein the outer end portion of the oil passage groove is arranged to be circumferentially staggered with respect to the deepest portion of the notch.

9. The fuel injection valve according to claim 1, wherein the movable member further includes a shaft portion that is made of a cast material, the flat-plate portion is formed of silicon steel to be in an annular shape, and the flat-plate portion is connected with an outer circumferential periphery of the shaft portion.

10. The fuel injection valve according to claim 9, wherein the flat-plate portion is sintered onto the outer circumferential periphery of the shaft portion.

11. The fuel injection valve according to claim 9, wherein the flat-plate portion is connected with the outer circumferential periphery of the shaft portion using friction pressure welding.

12. The fuel injection valve according to claim 1, wherein each notch is defined in a substantially V-shape that circumferentially opens at an angle that is equal to or greater than 45°.

13. The fuel injection valve according to claim 1, wherein the deepest portion of the notch is apart from the annular contacting face for a distance that is equal to or greater than 1.0 mm in a radial direction of the flat-plate portion.

14. The fuel injection valve according to claim 1, wherein the solenoid has a substantially annular-shaped stopper face on an outer circumferential periphery of the solenoid on a side of the flat-plate portion, the attracted face of the flat-plate portion has a substantially intermittently annular-shaped contacting face in an outer circumferential periphery of the flat-plate portion such that the contacting face is capable of contacting with the stopper face of the solenoid, and the oil passage groove extends in a substantially radial direction of the flat-plate portion such that the oil passage groove and the contacting face cross each other.

15. The fuel injection valve according to claim 14, wherein the annular contacting face protrudes from the attracted face in the axial direction of the movable member.

16. The fuel injection valve according to claim 14, wherein the movable member further includes a shaft portion that is made of a cast material, the flat-plate portion is made of silicon steel to be in a substantially annular shape, and the flat-plate portion is sintered onto the outer circumferential periphery of the shaft portion, so that the flat-plate portion is connected with an outer circumferential periphery of the shaft portion.

17. The fuel injection valve according to claim 14,
wherein the movable member further includes a shaft portion that is made of a cast material,
the flat-plate portion is made of silicon steel to be in a substantially annular shape, and
the flat-plate portion is connected with an outer circumferential periphery of the shaft portion using friction pressure welding.

18. The fuel injection valve according to claim 14, wherein each notch is defined in a substantially V-shape that circumferentially opens at an angle that is equal to or greater than 45°.

* * * * *